July 14, 1936.  E. S. CISCO  2,047,176
COOKING VESSEL
Filed Oct. 2, 1934
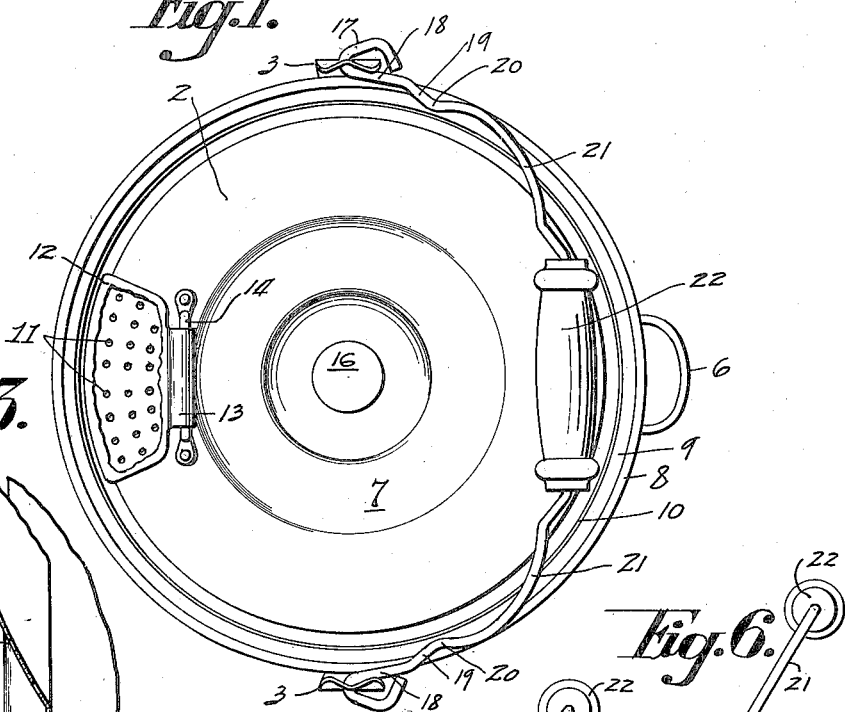
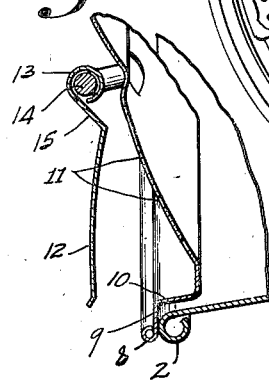
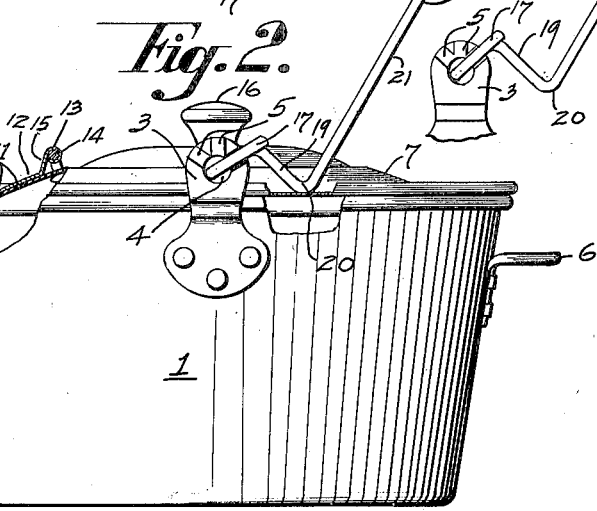
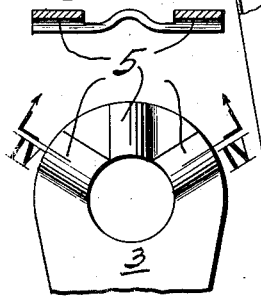
INVENTOR
Edward S. Cisco
BY
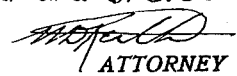
ATTORNEY Patented July 14, 1936

2,047,176

UNITED STATES PATENT OFFICE 2,047,176

COOKING VESSEL

Edward S. Cisco, Arnold, Pa., assignor to The Aluminum Cooking Utensil Company, New Kensington, Pa., a corporation of Pennsylvania Application October 2, 1934, Serial No. 746,521

3 Claims. (Cl. 53—8)

This invention relates to an improvement in metallic cooking vessels. It pertains to that type of vessel which has a handle, commonly called a bail, pivotally attached thereto, and a cover to complete the cooking unit; and it pertains more particularly to an improved relationship between the bail, vessel, and cover whereby the cover is held in position upon the vessel by means of a bail when the entire utensil is tilted for draining purposes.

My invention has for a primary object the provision of a vessel that may be drained through the cover by tilting, without danger of the cover being forced off by the weight of the contents. A further object is to accomplish this in a simple and efficient manner without parts additional to those customarily used in a bailed vessel.

Other objects, as well as the various novel features and advantages of my invention, will appear when explained in connection with the accompanying drawing, in which:

Fig. 1 represents in plan view my improved vessel with a portion of the cover broken away;

Fig. 2 represents an elevation, partly in section, of the vessel shown in Fig. 1;

Fig. 3 represents a fragmentary section taken on a central vertical plane through the utensil;

Fig. 4 represents a cross sectional view taken on the line IV—IV of Fig. 5;

Fig. 5 represents an enlarged fragmentary elevation of a bail ear;

Fig. 6 represents an alternative bail construction.

As shown in the drawing, my improved utensil comprises an open top vessel 1 of any desired size and shape, which I prefer to make of aluminum. The top edge is finished with an outwardly disposed annular bead 2. Secured to the outer surface of the vessel are two lugs or bail ears 3 which may be permanently secured in any desired fashion. As shown in Fig. 2, the bail ears 3 have a portion extending beyond the plane of the bead 2 in which there is formed an aperture 4. Extending from the outer edge of each bail ear to aperture 4, as shown to best advantage in Figs. 4 and 5, are a plurality of indentations 5, the purpose of which will be set forth in conjunction with the description of the bail. A handle 6, of a size and shape to permit a firm grasp, is secured to the vessel 1 midway between the bail ears 3, by any desired means.

A dome cover 7 closes the open top of the vessel. The cover is fabricated to fit the top of the vessel as shown in Fig. 2, where its edge is finished with an annular bead 8 which, with a narrow, horizontal, peripheral flange 9 immediately adjacent thereto, rests upon the bead 2 of the vessel 1. Adjacent to the flange 9, the cover 7 is deformed at an obtuse angle to the flange 9 to form a narrow inwardly- and downwardly-turned flange 10, which extends within the open top of the vessel 1 to complete the fit of the cover 7 therewith. In a localized area of the cover 7 adjacent to the flange 10, there are formed a number of drain apertures 11 which are preferably closed by a flap 12. As shown to best advantage in Fig. 1 a cut back edge 13, or offset portion, of the flap 12 is turned over a shallow U-shaped hinge pin 14, which is secured in inverted position to the cover 7 beyond the perforated area by any suitable means. The flap 12, as shown in Fig. 2, has adjacent the turned over portion of the cut back edge 13 a portion 15 disposed at an angle to the major portion of the flap 12 that permits that portion to contact the perforate area in order to cover it effectively when the vessel is in normal position. As viewed in Fig. 3, this form of flap swings freely from the perforate area when the vessel is tilted due to the elevation of the hinge pin 14 resulting from both its shape and position upon the dome cover 7 The cover may also be provided with a knob 16 of any desired size and shape.

A bail formed from permanently deformable wire or rod completes my improved utensils. As shown to best advantage in Fig. 1, the bail is pivotally attached to the vessel by means of portions 17 and 18 at each of its ends formed into loops and extending through each of the apertures 4 of the bail ears 3. The inner portions 18, which form a part of the bail proper, co-operate with the indentations 5 of the bail ears 3 to hold the bail in as many positions as there are indentations in each ear. To secure effective co-operation it is preferable to form the bail with a normal spread wider than the vessel so that when it is attached as described above the portions 18 press against the ears 3 and hold within the indentations 5, which are henceforth termed bail-locating indentations. Immediately adjacent the inner loop portions 18 of the bail are portions 19 which are bent to form substantially right angles with the inner loop portions 18 and with the remaining major portion 21 of the bail, as viewed in Fig. 2. As shown in Fig. 1, the bail portions 19 are inclined inwardly so that the apexes 20 of the angles formed by portions 19 and 21 can be made to bear upon the flange 9 of the cover 7 to positively secure the cover to the vessel. The bail may be provided with a grip 22 of suitable heat insulating material.

In Fig. 6 an alternative bail construction is shown wherein the loop portions 17 and 18 lie in a plane that intersects that of the major portion of the bail 21 at the uppermost part of the bail. It is apparent that the bail-locating indentations 5 must be spaced differently from those shown in the other figures to hold the bail in a bearing or clamping position upon the cover 7. In this modification it is also apparent that the central bail-locating indentations will coincide with the normal position of the bail for carrying the vessel.

It is evident that the cover 7 should be placed upon the vessel so that the apertures 11 are opposite the handle 6 to permit proper drainage of the vessel. When the vessel is lifted by means of bail handle 22 and handle 6, the then unbalanced weight of the vessel and its contents tends to tilt the vessel to a satisfactory draining position. It is also apparent from the accompanying drawing that the farther the vessel is tilted when so carried, the greater will be the pressure exerted by the bail through the apexes 20 upon the cover 7 to clamp or hold it in place against the vessel.

While my invention has been illustrated by the preferred form, it is intended to include all the various changes that may be made that come within the scope of the claims, without departing from the true relationship expressed therein. Therefore I claim:

1. A cooking utensil comprising a vessel with an open top, bail ears fixed to said vessel adjacent to said top, a cover for said vessel having a plurality of drain openings adjacent the edge thereof, and a bail pivotally connected to each of said bail ears by an end loop, the said bail having that portion of the bail proper adjacent each of said bail ears forming a part of said loops, and having that portion of the bail proper adjacent each of said loops bent to substantially a right angle to the remaining major portion of the bail proper, the apex of each of said angles being adapted to hold the cover in position when the vessel is tilted.

2. A cooking utensil comprising a vessel with an open top, a pair of bail ears fixed to said vessel adjacent said top, a bail-locating indentation in each of said bail ears, a cover for said vessel having a plurality of drain openings adjacent to the edge thereof, and a bail pivotally connected to each of said ears by an end loop, the said bail having that portion of each of said loops forming a part of the bail proper adapted to yieldably co-operate with the said bail-locating indentations in said bail ears, and having that part of the bail proper adjacent to each of said end loops bent to substantially a right angle to the remaining portion of the bail proper, the apex of each of said angles being adapted to clamp the cover against the top of the vessel when the said loop portions are positioned in said bail-locating indentations of said bail ears.

3. A cooking utensil comprising a vessel with an open top, a pair of bail ears fixed to said vessel adjacent said top, a plurality of bail-locating indentations in each of said bail ears, the indentations being arranged in co-operative pairs with respect to both bail ears, a cover for said vessel having a plurality of drain openings adjacent the edge thereof, and a bail pivotally connected to each of said bail ears by an end loop, the said bail having that portion of each of said loops forming a part of the bail proper adapted to yieldably co-operate with the said pairs of bail-locating indentations in the said bail ears and having that portion of the bail proper adjacent to each of said loop portions bent to substantially a right angle to the remaining major portion of the bail proper, the apex of each of said angles being adapted to clamp the cover against the top of the vessel when the said loop portions are positioned in one of said pairs of bail-locating indentations.

EDWARD S. CISCO.